United States Patent

[11] 3,600,810

[72] Inventors: Kenneth Henry Marshall, Castlecrag; Bruce Bertram Burns, Balgowlah; Thomas Laidlaw Gregan, Vaucluse New South Wales, all of, Australia
[21] Appl. No. 862,243
[22] Filed: Sept. 10, 1969
[45] Patented: Aug. 24, 1971
[73] Assignee: Premach Pty. Limited, Sydney, New South Wales, Australia

[54] DENTAL INSTRUMENTS
9 Claims, 5 Drawing Figs.

[52] U.S. Cl. ............................................. 32/49
[51] Int. Cl. ............................................. A61c 3/02
[50] Field of Search ................................. 32/40, 41, 42, 49

[56] References Cited
UNITED STATES PATENTS

| | | | |
|---|---|---|---|
| 472,004 | 3/1892 | Sweet et al. | 32/49 |
| 940,058 | 11/1909 | Quigley | 32/49 |
| 1,480,730 | 1/1924 | Lentz | 32/49 |
| 1,631,444 | 6/1927 | Warren | 32/49 |

Primary Examiner—Robert Peshock
Attorney—Kimmel, Crowell & Weaver

ABSTRACT: An aid for the dental preparation of a tooth for a jacket crown in which the depth of an axial cut and a circumferential cut of a bur is controlled mechanically, the aid comprising firstly a guide member securable over the bur and having a stem partly enclosing the bur and an outer tip to engage and protect a patient's gum and contacting the base of a tooth to limit the depth of circumferential cut, and secondly a barrel slidably housing a drive motor carrying the bur, the barrel being inserted into a guide sleeve fixable in the patient's mouth and having a follower engageable with a cam on the sleeve to limit the axial insertion of the barrel and bur so that the axial limit of the cut of the bur follows the patient's gum line.

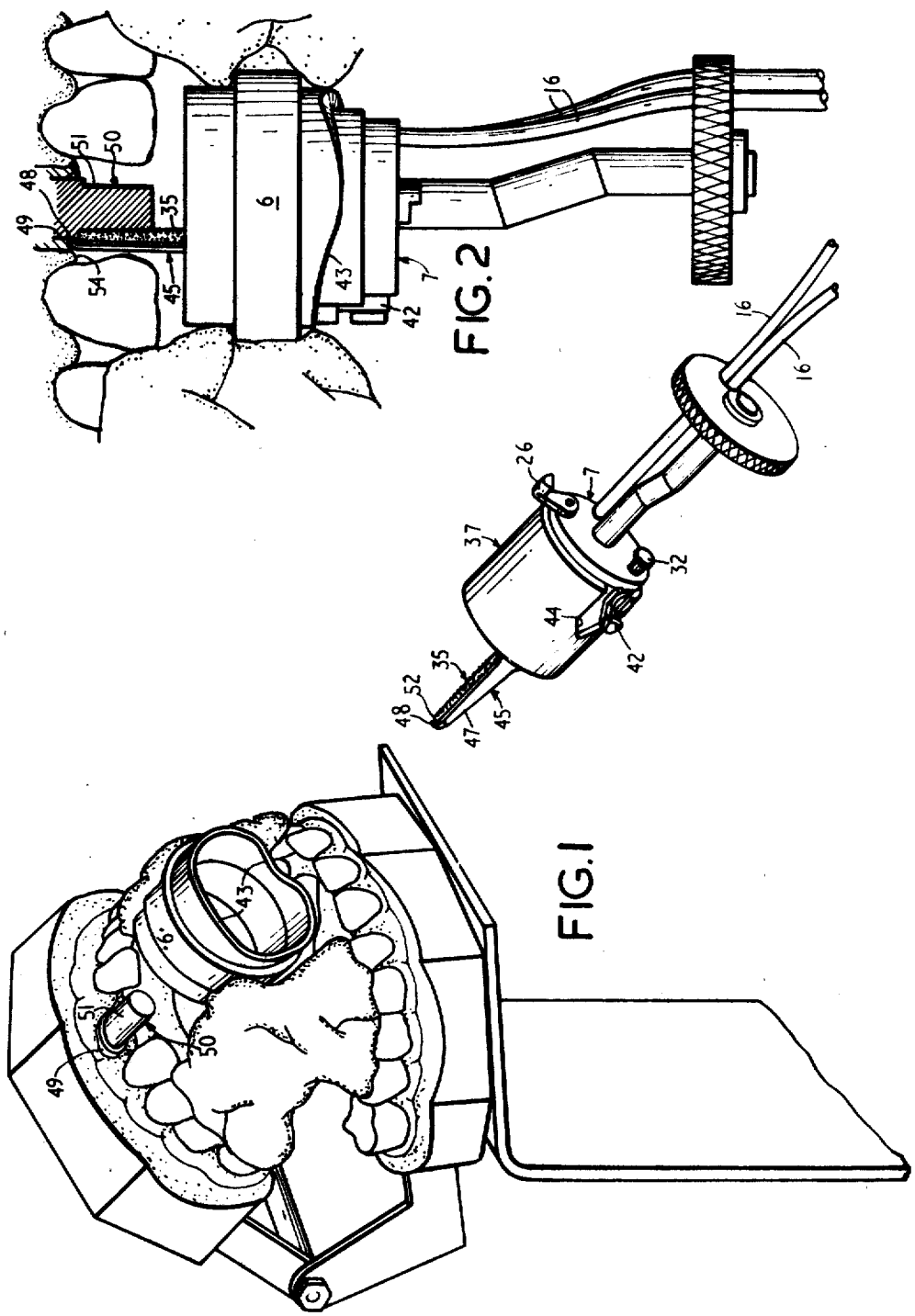

DENTAL INSTRUMENTS

This invention relates to dental instruments, and particularly to an improvement in the dental instrument described in U.S. Pat. No. 3,445,935.

The specification of the said patent describes a mechanical aid for dental preparations for the fitting of jacket crowns and the like. In the equipment the depth of gingival preparation is controlled by cam means while circumferential preparation of a tooth is closely controlled by predetermined offsetting of the cutting bur in a rotatable barrel. As the walls of a tooth generally do not conform to a cylindrical pattern several adjustments are required to be made to the degree of offsetting during preparation, i.e. different surfaces of the tooth require cutting on different circumferences. As a result the prepared tooth has a slightly fluted effect with a minute step formed at the join of adjacent circumferential cuts.

Although, this fluted effect provides for keying in the fitting of the jacket crown, time is occupied in making separate adjustments to the bur mounting. Furthermore, the final preparation represents a departure from the presently familiar form and consequently might not be popularly accepted within the dental profession.

It is the principal object of this invention to provide a means for controlling the circumferential cut in dental preparation which avoids the above-mentioned fluted effect and the necessity for changes in adjustment of the dental instrument.

To this end, the invention provides in one general form a guide member for a dental cutting bur comprising a mounting portion for fixing said member with respect to said bur, a stem portion to extend the full length of said bur and to at least one side thereof at least partly to enclose said bur and a tip portion on said stem portion to extend beyond the end of said bur to enter the gingival crevice and displace the gingival of a patient from said bur during subgingival preparation of a tooth and having a part to contact the side face of said tooth and limit the depth of the cut of said bur.

In another general form the invention provides a rotatable barrel for a dental instrument comprising a hollow housing, a plug unit, a turbine assembly slidable across the plug unit, resilient means urging the assembly to one part of the plug unit means for rotatably securing a cutting bur in the assembly, and means attaching a guide member of the kind referred to above to guide the bur during its operation.

A preferred embodiment of the invention is illustrated in the accompanying drawings, in which:

FIG. 1 is a perspective view of a typical cast made from an impression taken from a patient's mouth, showing a barrel in place on the cast and a plug unit and turbine assembly about to be inserted into the barrel to grind the required tooth mockup in a test run before performing the actual operation on the patients;

FIG. 2 is a fragmentary view of the actual grinding operation being carried out by the components shown in FIG. 1, the actual tooth being ground is shown in vertical section;

Figure 3:
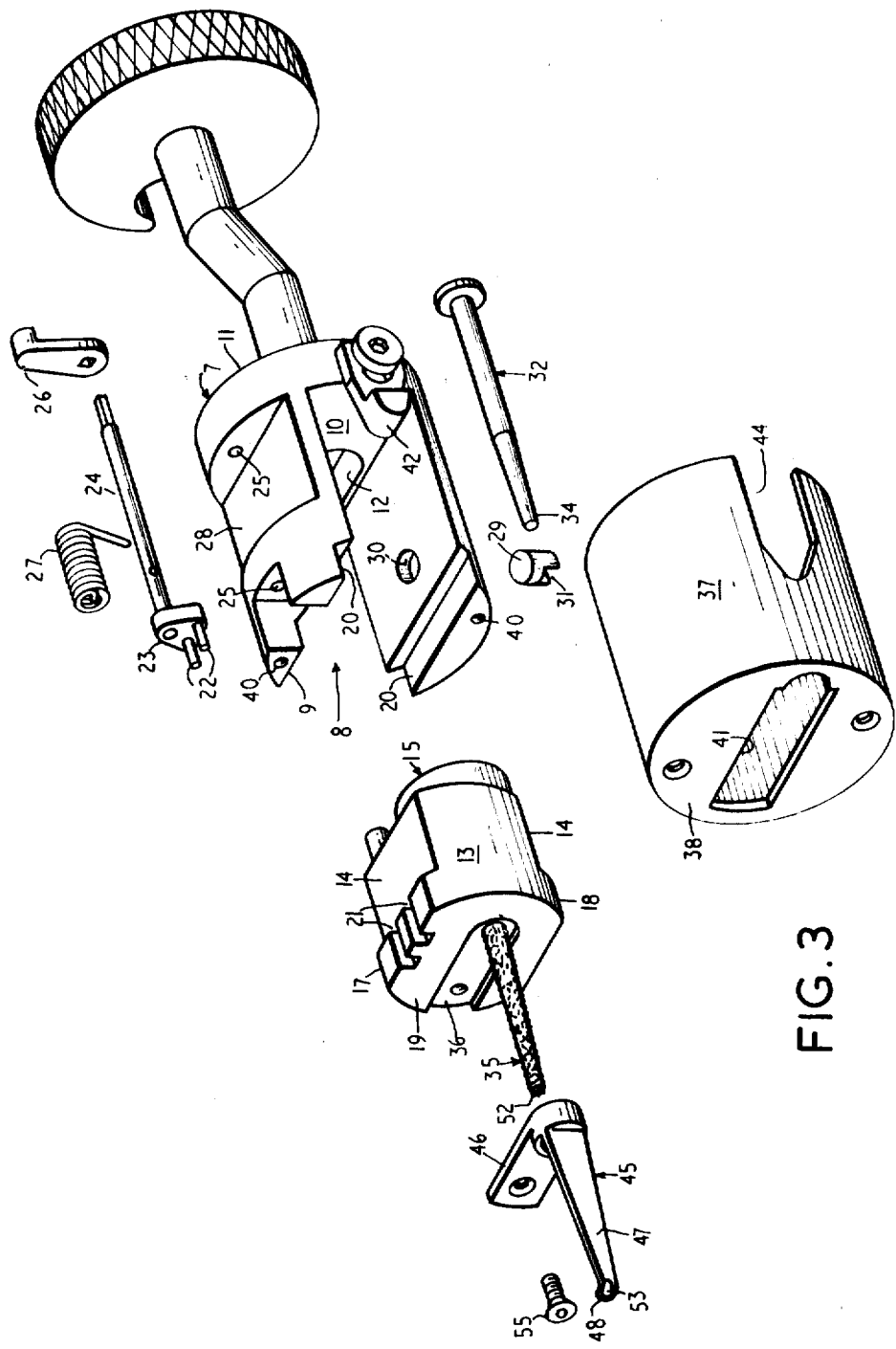
FIG. 3 is an exploded perspective view of the component parts of the plug unit and turbine assembly only.

The invention will now be described with reference to the preferred embodiment shown in the drawings in which the guide member 45 is provided with a barrel 7 for use in the instrument described in the specification of U.S. Pat. No. 3,445,935. Nevertheless, it should be understood that the guide member 45 of this invention may be suitably applied to a hand-held dental cutting instrument for freehand work. In this latter application it will greatly assist the dentist by considerably reducing the degree of skill required in dental preparations.

A barrel housing 7 of suitable design for rotation within a mounting guide sleeve 6 is provided having an axial slot 8 (FIG. 3) open at its end 9 and having a partly enclosing wall 10 at its other end wall 11. A radial slot 12 is provided in the enclosing wall 11. A plug assembly 13 is snugly fitted within the slot 8 and consists of a cylindrical body with two diametrically opposite flats 14 which enables it to slide radially within the slot 8 of the barrel housing 7. An air driven turbine assembly 15 is a press fit within a radially offset bore in the plug 13 so that it is free to slide to and fro across the diameter of the cylindrical barrel 7. The necessary air and water tubes 16 are connected to the turbine assembly.

Raised flanges 17 and 18 are formed integrally in the outer face 19 of the plug 13 and said flanges engage grooves 20 in the end 9 of the barrel. Several teeth 21 are cut in the flange 17 in the form of a rack and pegs 22 on a crank arm 23 engage therewith. The crank arm 23 is fixed on the end of a spindle 24 rotatably supported in longitudinal bores 25 in the barrel 7. A control arm 26 for the spindle 24 is secured to its other end and is accessible at the outer surface of the plug base 11. Rotation, therefore, of the spindle 24 by its control arm 26 will cause the turbine assembly plug 13 to move diametrally of the barrel housing 7. A helical spring 27 is positioned within a flat 28 in the housing 7 and on the spindle 24 to urge the turbine assembly 13 towards the center of the barrel housing 7.

Figure 4:
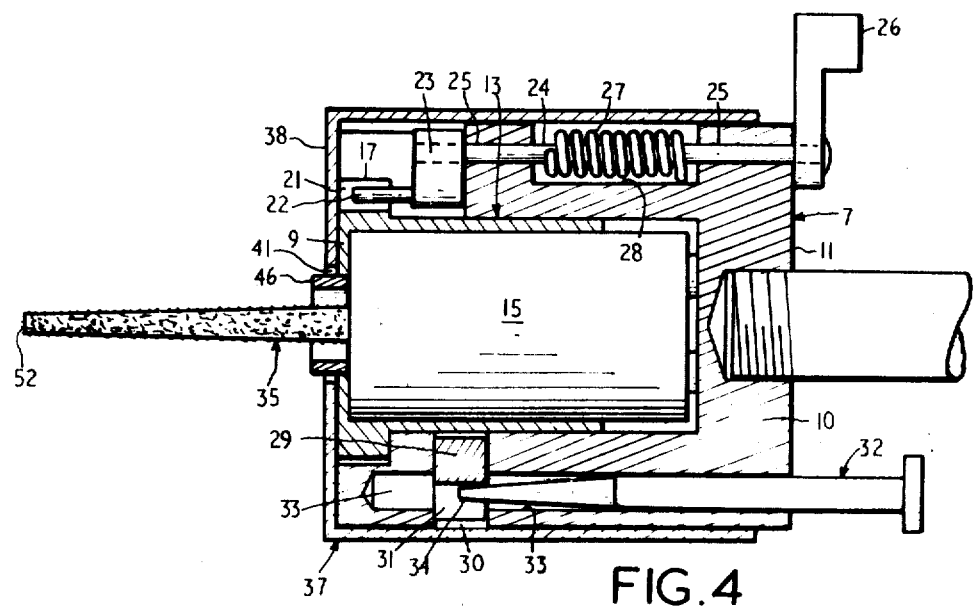
FIG. 4 is an enlarged side elevation of the plug unit and turbine assembly shown in half section; and, FIG. 5 is a front end elevation of the plug unit and turbine assembly.

Means are also provided to lock the plug 13 at any desired position within the rectangular slot 8 in the barrel housing 7. A cylindrical friction pad 29 (FIGS. 3 and 4) is slidably mounted in a radial bore 30 in the housing 7. A diametral slot 31 is cut across the outer end of the pad 29. a tapered wedge pin 32 is slidably accommodated in a longitudinal bore 33 in the housing 7 which communicates with the previously described radial bore 30. The tapered end 34 of the pin 32 engages the slot 31 so that when the pin 32 is pushed inwardly the pad 29 is forced into contact with the plug 13 to lock it in place.

A cutting bur 35, driven by the turbine 15, extends through the face 19 of the plug 13. A shallow diametral groove 36 is formed in the face 19 for a purpose to be described later.

Figure 5:
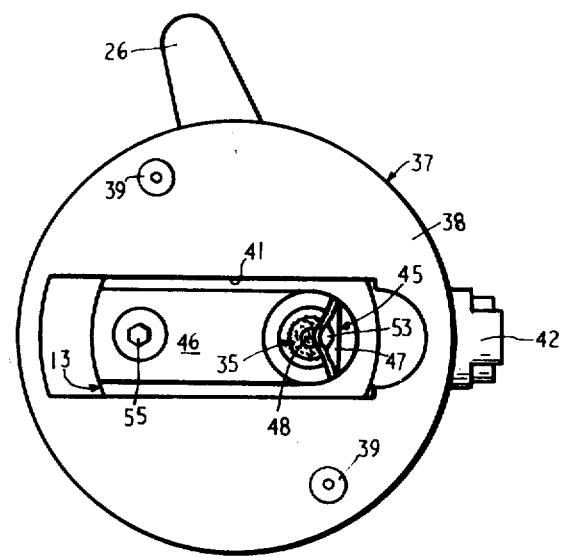

A tubular sheath 37 with one closed end 38 is a sliding fit over the barrel housing 7 and is retained by screws 39 (FIG. 5) which engage threaded holes 40 in said barrel 7. A diametral aperture 41 is provided in the end 38 of the sheath 37 so that the bur 35 can extend therethrough and be displaced diametrally by the mechanism already described.

A cam follower pad 42 is adjustably secured to the side of the rear wall 11 of the barrel 7. The follower 42 engages the specially contoured edge 43 of the guide 6 as shown in FIG. 2. The side of the sheath 37 is cut away at 44 to clear the follower 42 when the said sheath is in place.

A guide member 45 is secured by a mounting portion, composed of a flat base 46 which seats within a groove 36 in the end 19 of the turbine assembly plug 13. A bur-shading portion comprising a stem 47 of the guide member is integrally formed with the mounting portion 46 and when fastened in position extends partly around the bur 35 for its entire extending length. This stem 47 of the guide member 45 may be constructed to different designs but in a preferred form it comprises a straight tapering stem 47 flat on its outer face and curved on its inner face.

The outer end of the stem 47 is turned over to form tip portion with a convex tooth-engaging face 48, which as shown in FIG. 2 will contact the side face 49 of a tooth 50 and limit the depth of a bur cut 51. The tip portion provided on the stem 47 extends slightly beyond the end 52 of the bur 35. Preferably, its sides are tapered and its curved face is provided with a chamfer 53 so that when in use it will enter the gingival crevice to fold back the gingiva 54 and protect it from damage by the bur 35 during subgingival preparation of the tooth 50.

When in use with the barrel 7 described above the turbine assembly 13 carrying the cutting bur 35 and its shading guide member 45 will normally be displaced by the dentist against the spring action by turning the control arm 26 in one direction. If the barrel is introduced to the mounting guide sleeve 6 in this condition the cutting bur will be spaced from the circumferential face of the tooth 50 under preparation until the control arm 26 is released. The bur 35 will then be urged by the spring 27 on to the surface of the tooth 50 and will cut at 51 to a depth corresponding to the extent to which it is revealed beyond the convex face 48 of the tip portion of the stem 47 of the guide member 45. The convex face 48 of the guidemember 45 will contact the face 49 of the tooth 50 adjacent the cut 51 and prevent the bur 35 from cutting deeper into the tooth structure. As the bur 35 is advanced around the tooth 50 it will at all times be controlled by the convex face 48 contacting the tooth and thereby controlling the depth of cut 51 continually. A further function is performed by the convex face 48 of the guide member 45 as additionally it penetrates beneath the gingival margin and presses the fold in the gingival 54 away from the cutting bur 35.

It may happen that the space between the tooth 50 and adjacent teeth is insufficient to allow both the bur 35 and guide member 45 to pass therethrough. In this case the plug 13 can be locked by pushing in the wedge pin 32, and the whole barrel assembly 7 withdrawn from the guide 6. The guide member 45 is now removed by withdrawal of its anchoring setscrew 55. The barrel is inserted back into the guide 6 and with the plug 13 still locked the tooth 50 is cut in the vicinity of the space between it and the next tooth. The barrel 7 can now be removed, the guide member 45 replaced and the barrel 7 reinserted to continue the cutting of the tooth 50.

In practice, when the guide member 45 is used with the barrel housing 7 and guide sleeve 6 it will be found advisable to prepare firstly the lingual surface of the tooth 50 until the guide member contacts the proximal tooth on both sides of the tooth being prepared. The position of plug 13 is then fixed by means of the adjustment control just described and the guide member 45 is removed and the bur is permitted to cut the interproximal surfaces at the fixed radius. After the interproximal surfaces are cut the guide member 45 is restored and the labial surface of the tooth 50 is then prepared.

Sometimes due to encroachment of adjacent teeth into the circumferential cut being made on the tooth being prepared it is desirable to incline the axis of the cutting bur 35. By increasing the angle of inclination an increased conical form is imparted to the preparation. A preferred manner of obtaining this inclination is to arrange the bore in the barrel housing inclined to the housing axis. As an alternative the barrel housing may be provided with an internal sleeve having an axially inclined bore.

A preferred embodiment has been described in the foregoing passages but it is to be understood that other forms and embodiments are feasible within the scope of this invention.

What we claim is:

1. An improved dental instrument for use in preparing the tooth of a patient for the installation of a jacket crown, said instrument to be used in conjunction with a bur and a hollow guide sleeve having a pair of opposed ends and means for detachably fixing said sleeve within the mouth of the patient, the improvement comprising:
    a cylindrical barrel which is freely rotatable and controllably axially slidable within said guide sleeve to permit controlled subgingival cutting of said tooth,
    a turbine assembly mounted in said barrel, said turbine assembly being mounted for transverse sliding movement said bur being connected to said turbine assembly for rotation thereby and said bur extending from said barrel for engagement with the tooth,
    resilient means for biasing said turbine assembly and said bur into cutting contact radially of said tooth, and
    a removable guide member shading the bur, said guide member having means for engaging said tooth for resisting the force of said resilient means on said turbine assembly and said bur to thereby control the radial depth of cutting by said bur.

2. A dental instrument as set forth in claim 1 including:
    a cam follower mounted on said barrel, and
    one end of said sleeve is contoured to form a cam track, said cam follower engaging said cam track to limit the degree of axial penetration of said bur beneath the gingival margin of said tooth as said barrel is rotated within said guide sleeve.

3. A device as set forth in claim 1 wherein said barrel has an end wall with a diametral opening therethrough through which said bur extends, and
    said turbine assembly is mounted in a plug, said bur being slidable along said diametral opening on transverse movement of said plug.

4. A device as set forth in claim 3 including a rack mounted on said plug, and
    operating means mounted on said barrel for engaging said rack to move said plug, said turbine assembly and said bur against the force of said resilient means.

5. A device as set forth in claim 4 including locking means disposed in said housing for locking said plug in position in said barrel to facilitate removal and return of said barrel with respect to said guide sleeve without alteration of the relative radial position of said bur with respect to said tooth where it is necessary to remove said guide sleeve to permit unobstructed cutting of the proximal faces of said tooth.

6. A dental instrument as set forth in claim 3 including:
    a cam follower mounted on said barrel, and
    one end of said guide sleeve is contoured to form a cam track, said cam follower engaging said cam track to limit the degree of axial penetration of said bur beneath the gingival margin of said tooth as said barrel is rotated within said guide sleeve.

7. A dental instrument as set forth in claim 4 including:
    a cam follower mounted on said barrel, and
    one end of said guide sleeve is contoured to form a cam track, said cam follower engaging said cam track to limit the degree of axial penetration of said bur beneath the gingival margin of said tooth as said barrel is rotated within said guide sleeve.

8. A dental instrument as set forth in claim 5 including:
    a cam follower mounted on said barrel, and
    one end of said guide sleeve is contoured to form a cam track, said cam follower engaging said cam track to limit the degree of axial penetration of said bur beneath the gingival margin of s said tooth as said barrel is rotated within said guide sleeve.

9. A device as set forth in claim 1 including an extended finger knob mounted on said barrel whereby the barrel may be manually rotated within said guide sleeve as cutting of the tooth progresses.